(12) United States Patent
Youtz et al.

(10) Patent No.: US 10,568,149 B2
(45) Date of Patent: Feb. 18, 2020

(54) 5G RADIO MANAGEMENT BASED ON THERMAL, BATTERY, OR TRANSMIT POWER CONSIDERATIONS

(71) Applicant: Verizon Patent and Licensing Inc., Arlington, VA (US)

(72) Inventors: Andrew E. Youtz, Princeton, NJ (US); Lily Zhu, Parsippany, NJ (US); Xin Wang, Morris Plains, NJ (US); Balaji L. Raghavachari, Bridgewater, NJ (US)

(73) Assignee: Verizon Patent And Licensing Inc., Basking Ridge, NJ (US)

( * ) Notice: Subject to any disclaimer, the term of this patent is extended or adjusted under 35 U.S.C. 154(b) by 87 days.

(21) Appl. No.: 15/907,024

(22) Filed: Feb. 27, 2018

(65) Prior Publication Data
US 2019/0268950 A1     Aug. 29, 2019

(51) Int. Cl.
| | |
|---|---|
| *H04W 76/10* | (2018.01) |
| *H04W 52/36* | (2009.01) |
| *H04W 76/30* | (2018.01) |
| *H04W 76/32* | (2018.01) |
| *H04W 76/16* | (2018.01) |

(52) U.S. Cl.
CPC ......... *H04W 76/10* (2018.02); *H04W 52/367* (2013.01); *H04W 76/16* (2018.02); *H04W 76/30* (2018.02); *H04W 76/32* (2018.02)

(58) Field of Classification Search
CPC .... H04W 76/10; H04W 76/30; H04W 52/367
See application file for complete search history.

(56) References Cited

U.S. PATENT DOCUMENTS

| 9,504,081 B2 * | 11/2016 | Anderson | H04W 76/38 |
| 2008/0200220 A1 * | 8/2008 | Jackson | G06F 1/3203 |
| | | | 455/574 |
| 2013/0051261 A1 * | 2/2013 | Kazmi | H04B 7/0693 |
| | | | 370/252 |
| 2014/0056376 A1 * | 2/2014 | Guo | H04B 7/06 |
| | | | 375/267 |
| 2014/0200042 A1 * | 7/2014 | Chen | H04W 76/15 |
| | | | 455/500 |
| 2014/0247729 A1 * | 9/2014 | Sahu | H04W 52/0261 |
| | | | 370/252 |
| 2014/0302874 A1 * | 10/2014 | Zakrzewski | H04W 4/70 |
| | | | 455/456.1 |

(Continued)

*Primary Examiner* — Will W Lin

(57) ABSTRACT

A user equipment (UE) can determine that a thermal condition or a battery condition is satisfied with regard to the UE, wherein the UE is associated with a 4G/Long Term Evolution (4G/LTE) connection and a 5G/New Radio (5G/NR) connection; determine whether the 5G/NR connection is to be activated or deactivated based on the thermal condition or the battery condition; transmit a tracking area update request based on determining that the thermal condition or the battery condition is satisfied; transmit capability information, wherein, when the 5G/NR connection is to be activated, the capability information indicates a 5G/NR capability of the UE, and wherein, when the 5G/NR connection is to be deactivated, the capability information does not indicate the 5G/NR capability of the UE; and deactivate or activate a 5G/NR modem of the UE based on determining that the thermal condition or the battery condition is satisfied.

20 Claims, 10 Drawing Sheets

(56) References Cited

U.S. PATENT DOCUMENTS

| | | | |
|---|---|---|---|
| 2015/0003385 A1* | 1/2015 | Kim | H04W 52/146 |
| | | | 370/329 |
| 2018/0063764 A1* | 3/2018 | Bollapalli | H04W 76/10 |
| 2018/0242256 A1* | 8/2018 | Nenner | H04W 52/0216 |
| 2018/0242319 A1* | 8/2018 | Akkarakaran | H04W 72/12 |
| 2018/0309409 A1* | 10/2018 | Khlat | H03F 1/0227 |
| 2019/0014612 A1* | 1/2019 | Lee | H04W 76/16 |
| 2019/0021052 A1* | 1/2019 | Kadiri | H04W 76/28 |
| 2019/0075537 A1* | 3/2019 | Wu | H04W 60/005 |
| 2019/0075604 A1* | 3/2019 | Wang | H04W 76/15 |
| 2019/0082395 A1* | 3/2019 | Malladi | H04W 52/245 |

* cited by examiner

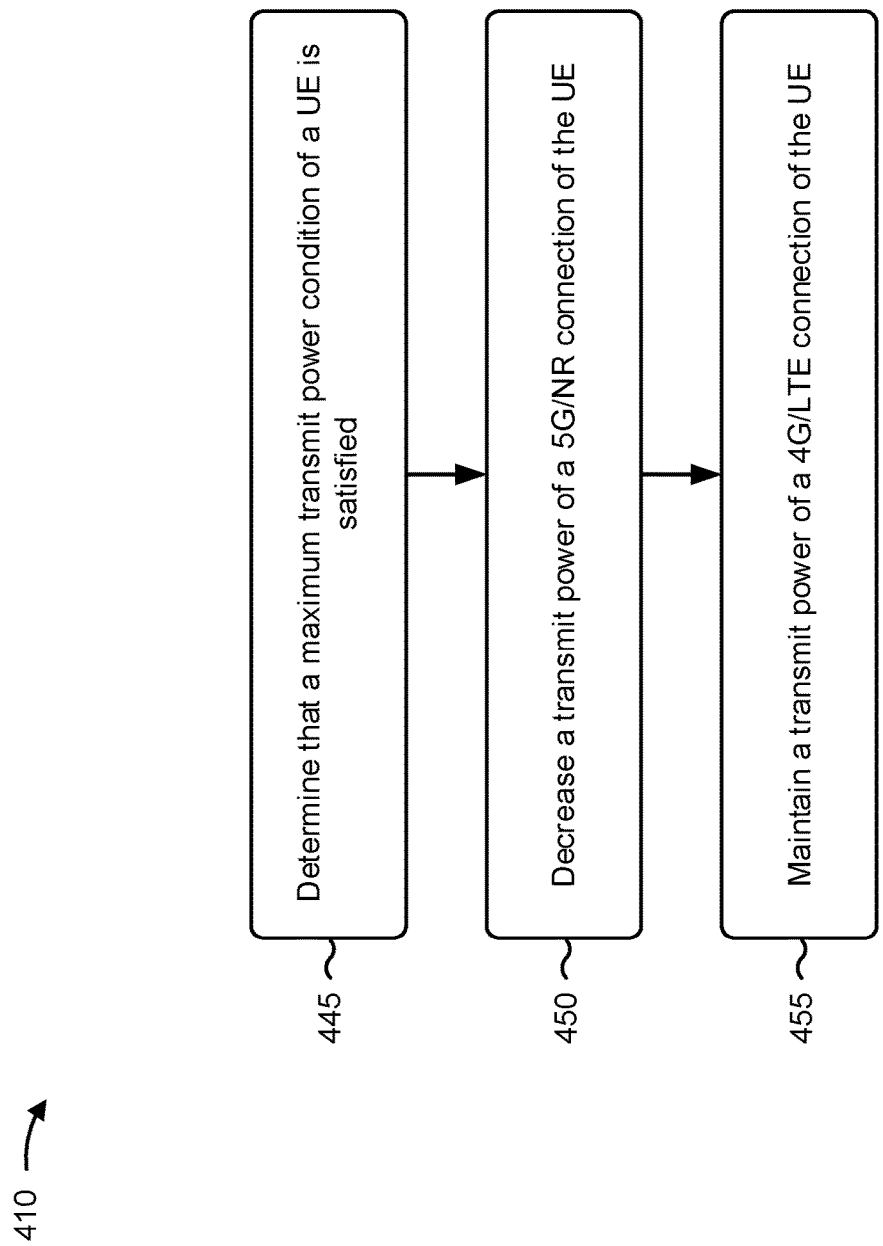

5G RADIO MANAGEMENT BASED ON THERMAL, BATTERY, OR TRANSMIT POWER CONSIDERATIONS

BACKGROUND

5G/New Radio (5G/NR) provides various enhancements to wireless communications, such as flexible bandwidth allocation, improved spectral efficiency, ultra-reliable low-latency communications (URLLC), beamforming, high-frequency communication (e.g., millimeter wave (mmWave), and/or the like. User equipment (UEs) during the transition between 4G/Long Term Evolution (4G/LTE) and 5G/NR can support the simultaneous use of 4G/LTE and 5G/NR.

BRIEF DESCRIPTION OF THE DRAWINGS

FIGS. 4A and 4B are flow charts of example processes for selectively activating a 5G/NR connection based on a thermal condition or a battery condition, and for selectively reducing transmit power for a 5G/NR connection based on a maximum transmit power, respectively.

DETAILED DESCRIPTION OF PREFERRED EMBODIMENTS

Figure 1A:
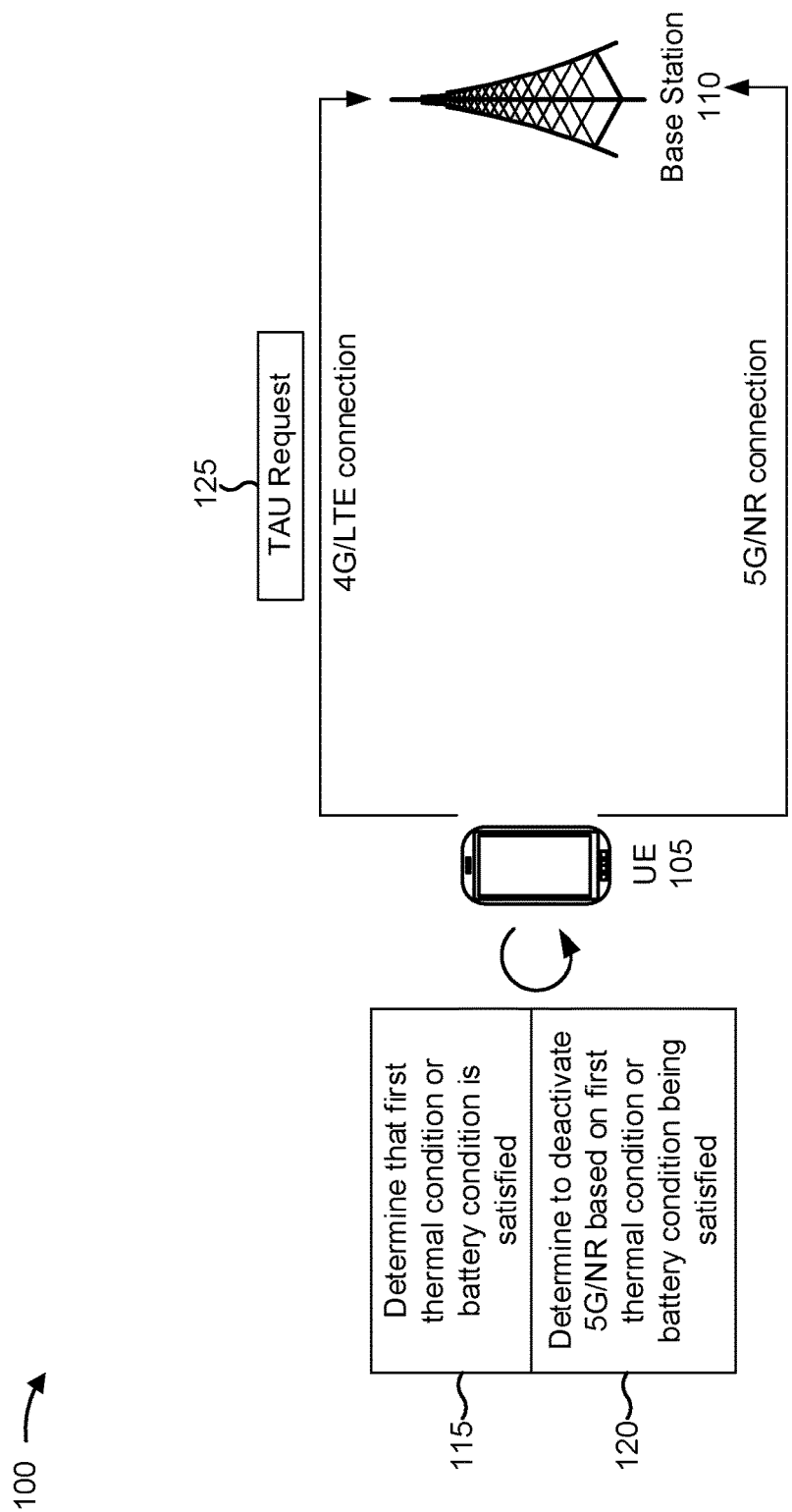
FIGS. 1A-1D are diagrams of an overview of an example implementation described herein.

The following detailed description of example implementations refers to the accompanying drawings. The same reference numbers in different drawings can identify the same or similar elements.

A UE can provide dual connectivity with regard to two or more radio access technologies (RATs). One dual connectivity configuration is E-UTRAN-NR dual connectivity (EN-DC), which can provide dual connectivity between an Evolved Universal Mobile Telecommunications System (UMTS) Terrestrial Radio Access network (E-UTRAN), such as 4G/LTE, and a NR network, such as 5G/NR. For example, the 4G/LTE network can provide a fallback option when 5G/NR coverage is not adequate or when some services (e.g., Voice over Internet Protocol (VoIP), such as Voice over LTE (VoLTE), and/or other services) are not deployed on the 5G/NR network.

The UE can use significant resources to simultaneously communicate using 4G/LTE and 5G/NR. For example, 5G/NR can be associated with a higher baseband processing load due to the larger bandwidths and throughputs of 5G/NR. This can generate more heat and use more battery and processor resources than a UE using only 4G/LTE. Heat generation is undesirable for various reasons including user experience, damage to the UE, and frequency drift of the UE. Furthermore, simultaneously communicating using 4G/LTE and 5G/NR can require a higher total UE transmit power (e.g., total radiated power (TRP), total effective isotropic radiated power (EIRP), or a similar measure of transmitted power of the UE) than communicating using a single RAT. The higher total UE transmit power can increase battery usage and heat generation, and can require more sophisticated and expensive amplifiers.

Some implementations described herein can provide for management of a 5G/NR radio connection based at least in part on thermal considerations, battery considerations, and/or transmit power considerations. For example, some implementations described herein can determine that a thermal condition or a battery condition is satisfied with regard to a UE, and can deactivate a 5G/NR modem of the UE based on the thermal condition or the battery condition being satisfied. In such a case, the UE can communicate with a network (e.g., a base station associated with the 5G/NR connection) to cause the 5G/NR connection to be deactivated or torn down on the network side. In some implementations, some implementations described herein can selectively decrease a transmit power of a 5G/NR connection of the UE when a total transmit power of the UE exceeds a maximum transmit power of the UE. In this way, a 4G/LTE connection can be maintained while the maximum transmit power is satisfied, thus reducing impact on user-facing services such as VoLTE calling. In this way, some implementations described herein can conserve battery resources, reduce thermal output, and improve performance of the UE in uplink power-limited scenarios.

FIGS. 1A-1D are diagrams of an overview of an example implementation 100 described herein. FIGS. 1A-1D show an example of selectively deactivating a 5G/NR connection (in FIGS. 1A and 1B) and activating a 5G/NR connection (in FIGS. 1C and 1D) based on a thermal condition or a battery condition. As shown, example implementation 100 can include a UE 105 (e.g., UE 210, as described below) and a base station 110 (e.g., base station 220, as described below). As further shown, UE 105 can be associated with a 4G/LTE connection and a 5G/NR connection. For example, UE 105 can be an EN-DC UE that provides simultaneous connectivity with regard to a 4G/LTE network and a 5G/NR network. In some implementations, base station 110 can be a single base station that provides 4G/LTE and 5G/NR access. In some implementations, base station 110 can include a 4G/LTE base station (e.g., an eNB) and a 5G/NR base station (e.g., a gNB), which may or may not be collocated.

As shown by reference number 115, UE 105 can determine that a first thermal condition or battery condition is satisfied. The first thermal condition or battery condition can cause UE 105 to deactivate a 5G/NR connection when the first thermal condition or battery condition is satisfied. For example, the 5G/NR connection can use significant battery and processor resources of UE 105, which can increase heat generation and battery consumption of UE 105. This, in turn, can impact battery life and user experience, and can damage UE 105 if temperatures are sufficiently high. In some implementations, UE 105 can determine that the first thermal condition is satisfied when a thermal value of UE 105 satisfies a threshold (e.g., when a temperature associated with UE 105 is too high). Additionally, or alternatively, UE 105 can determine that the first battery condition is satisfied when a battery level of UE 105 satisfies a threshold (e.g., when a battery level of UE 105 is too low).

As shown by reference number 120, UE 105 can determine to deactivate 5G/NR based on the first thermal condition or battery condition being satisfied. For example, when the thermal value or the battery level satisfies a corresponding threshold, UE 105 can determine that the 5G/NR connection is to be released or torn down, and/or that a 5G/NR modem of UE 105 is to be deactivated (e.g., placed in an idle mode, turned off, etc.).

As shown by reference number 125, UE 105 can provide a tracking area update (TAU) request based on determining to deactivate 5G/NR. For example, UE 105 can provide the TAU request to trigger a TAU by base station 110. In the TAU request, UE 105 may include a particular value indicating that a UE radio capability update is needed (e.g., a "UE radio capability information updated needed" information element). This may indicate that UE 105 is to update the UE 105's RRC capabilities. A mobility management entity may cause base station 110 to initiate a radio resource control (RRC) UE capability transfer procedure with regard to UE 105. As part of the RRC UE capability transfer procedure, UE 105 provides capability information to indicate RATs with which UE 105 can communicate. UE 105 can modify the capability information to cause base station 110 to deactivate the 5G/NR connection, as described in more detail below. In some implementations, UE 105 can provide the TAU request via the 4G/LTE connection.

Figure 1B:
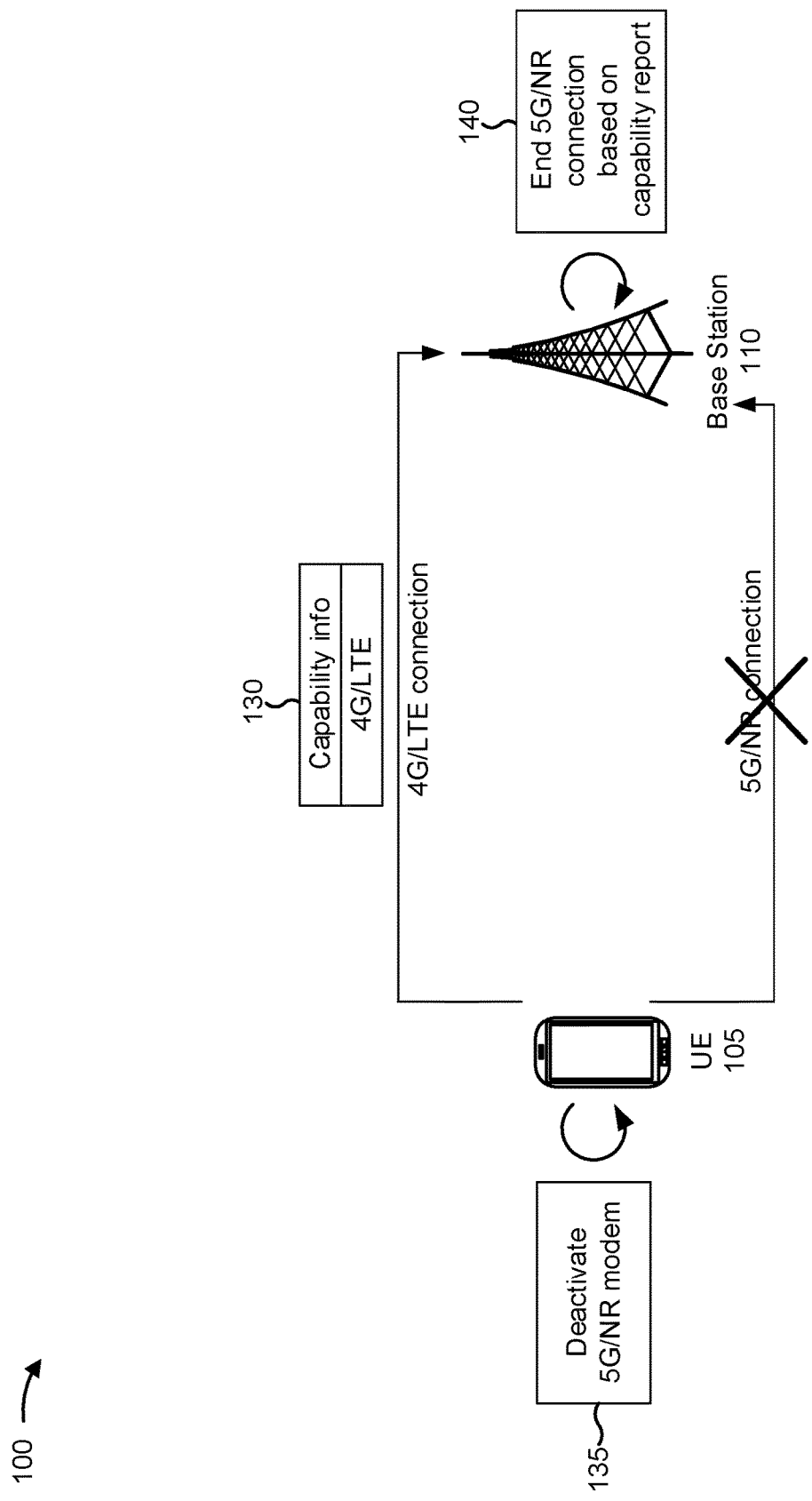

As shown in FIG. 1B, and by reference number 130, UE 105 can provide capability information to base station 110. For example, UE 105 can provide the capability information via the 4G/LTE connection. In some implementations, the capability information can be provided using a UE radio capability information update information element.

As shown, the capability information can identify a 4G/LTE capability of UE 105. As further shown, the capability information might not identify a 5G/NR capability of UE 105. In this way, UE 105 can cause base station 110 to release or end the 5G/NR connection with UE 105. Thus, data blackholing and/or other data loss is prevented by causing base station 110 to release or end the 5G/NR connection before a 5G/NR modem of UE 105 is deactivated.

As shown by reference number 135, UE 105 can deactivate a 5G/NR modem of UE 105. This can reduce processor and battery usage of UE 105, thereby reducing temperature and improving battery life of UE 105. Thus, UE 105 can selectively deactivate 5G/NR based on the first thermal condition or battery condition, thereby improving user experience and improving battery life.

As shown by reference number 140, base station 110 can end the 5G/NR connection with UE 105 based on the capability report. For example, base station 110 can end the 5G/NR connection based on the capability report not identifying the 5G/NR capability. In some implementations, base station 110 can establish a 4G/LTE data bearer with UE 105. For example, in a case where the 4G/LTE is a voice connection (e.g., a voice bearer) and the 5G/NR connection is a data connection, base station 110 and UE 105 can establish a data connection (e.g., a data bearer) using 4G/LTE. In this way, data communication of UE 105 can be preserved.

Figure 1C:
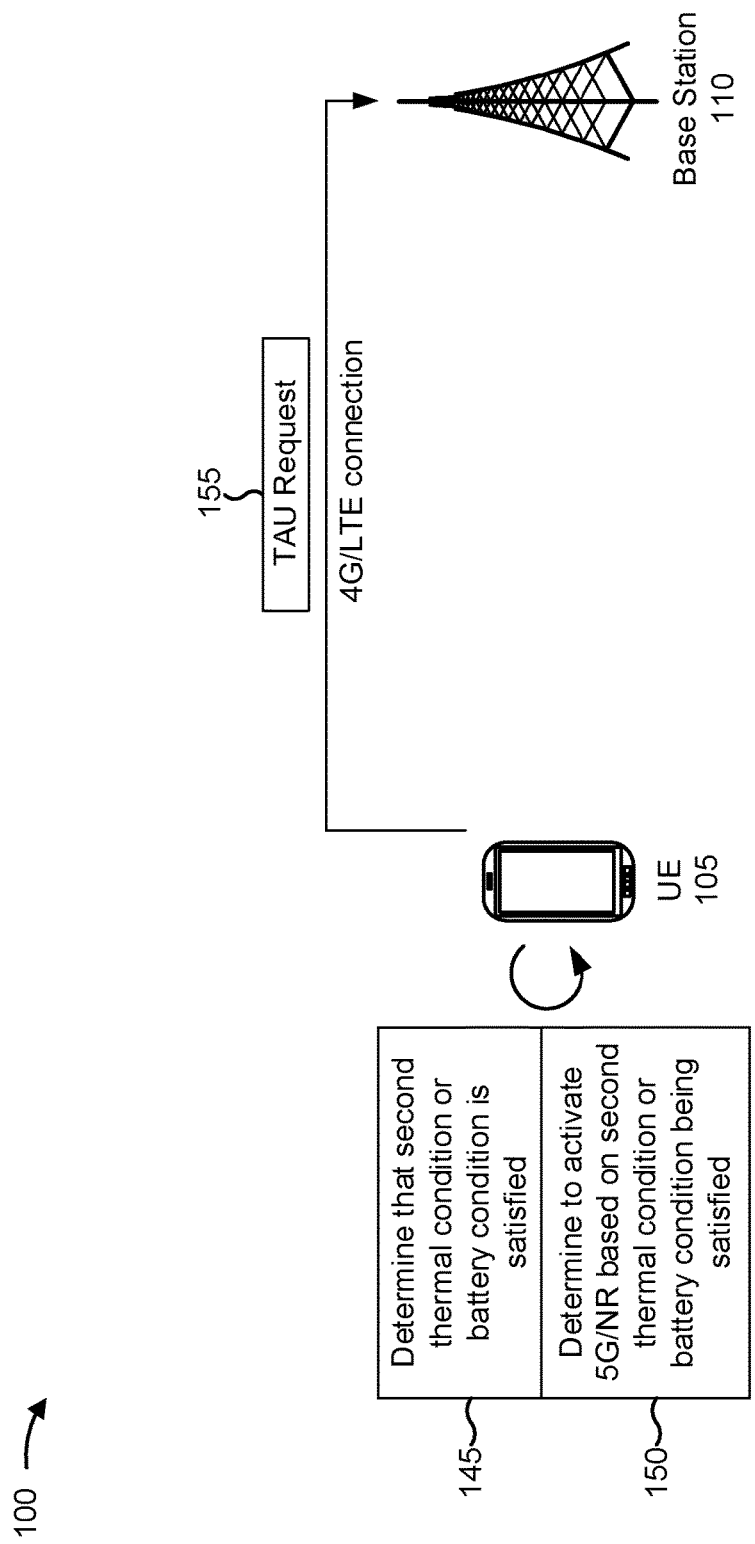
Figure 1D:
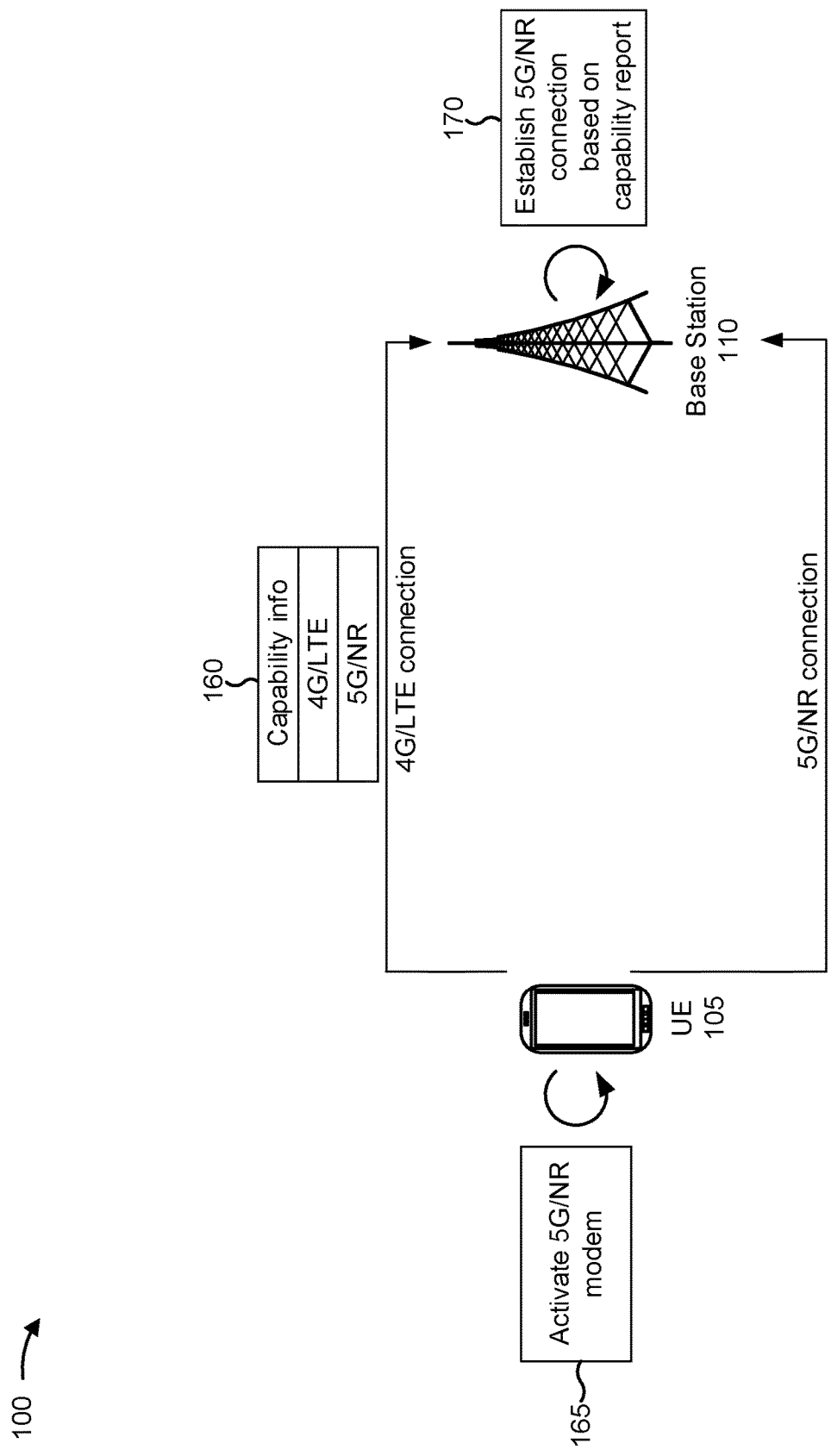

FIGS. 1C and 1D show an implementation wherein UE 105 activates a 5G/NR connection based on a second thermal condition or battery condition. As shown in FIG. 1C, and by reference number 145, UE 105 can determine that a second thermal condition or battery condition is satisfied. In some implementations, the second thermal condition or battery condition can be based on the first thermal condition or battery condition. For example, when a threshold associated with the first thermal condition is not satisfied by a thermal value, UE 105 can determine that the second thermal condition is satisfied. Similarly, when a threshold associated with the first battery condition is not satisfied, UE 105 can determine that the second battery condition is satisfied. In some implementations, there can be a gap between the threshold associated with the first thermal condition or battery condition and the threshold associated with the second thermal condition or battery condition. This can prevent rubber-banding between activation and deactivation of the 5G/NR connection.

As shown by reference number 150, UE 105 can determine to activate the 5G/NR connection based on the second thermal condition or battery condition being satisfied. As shown by reference number 155, UE 105 can provide a TAU request to base station 110, as described in more detail elsewhere herein.

As shown in FIG. 1D, and by reference number 160, UE 105 can provide capability information to base station 110 based on providing the TAU request (e.g., as part of a UE capability transfer procedure). As further shown, the capability information can indicate that UE 105 is capable of communicating using 4G/LTE and 5G/NR. As shown, the capability information can be provided using the 4G/LTE connection (e.g., since the 5G/NR connection is not yet active).

As shown by reference number 165, UE 105 can activate a 5G/NR modem based on determining that the second thermal condition or battery condition is satisfied. For example, UE 105 can activate the 5G/NR modem by powering on the 5G/NR modem or switching the 5G/NR modem to an active state.

As shown by reference number 170, UE 105 and base station 110 can establish a 5G/NR connection based on the capability report. In some implementations, UE 105 and base station 110 can establish a data connection, such as a data bearer and/or the like. In some implementations, UE 105 and base station 110 can end a data connection (e.g., a data bearer) associated with a 4G/LTE connection, which conserves processor, battery, and radio resources that would otherwise be used to maintain 4G/LTE and 5G/NR data connections.

In this way, UE 105 selectively causes a 5G/NR connection to be activated or deactivated based on a battery condition or thermal condition of UE 105. Thus, the 5G/NR connection can be deactivated when battery drain or UE temperature are too high, thereby conserving battery power and preventing temperature-based damage to UE 105. Conversely, the 5G/NR connection can be activated when a battery level of UE 105 is sufficiently high or temperature is sufficiently low, thereby improving throughput and enabling multi-RAT operation of UE 105 in acceptable temperature and battery states.

As indicated above, FIG. 1 is provided merely as an example. Other examples are possible and can differ from what was described with regard to FIG. 1.

Figure 2:
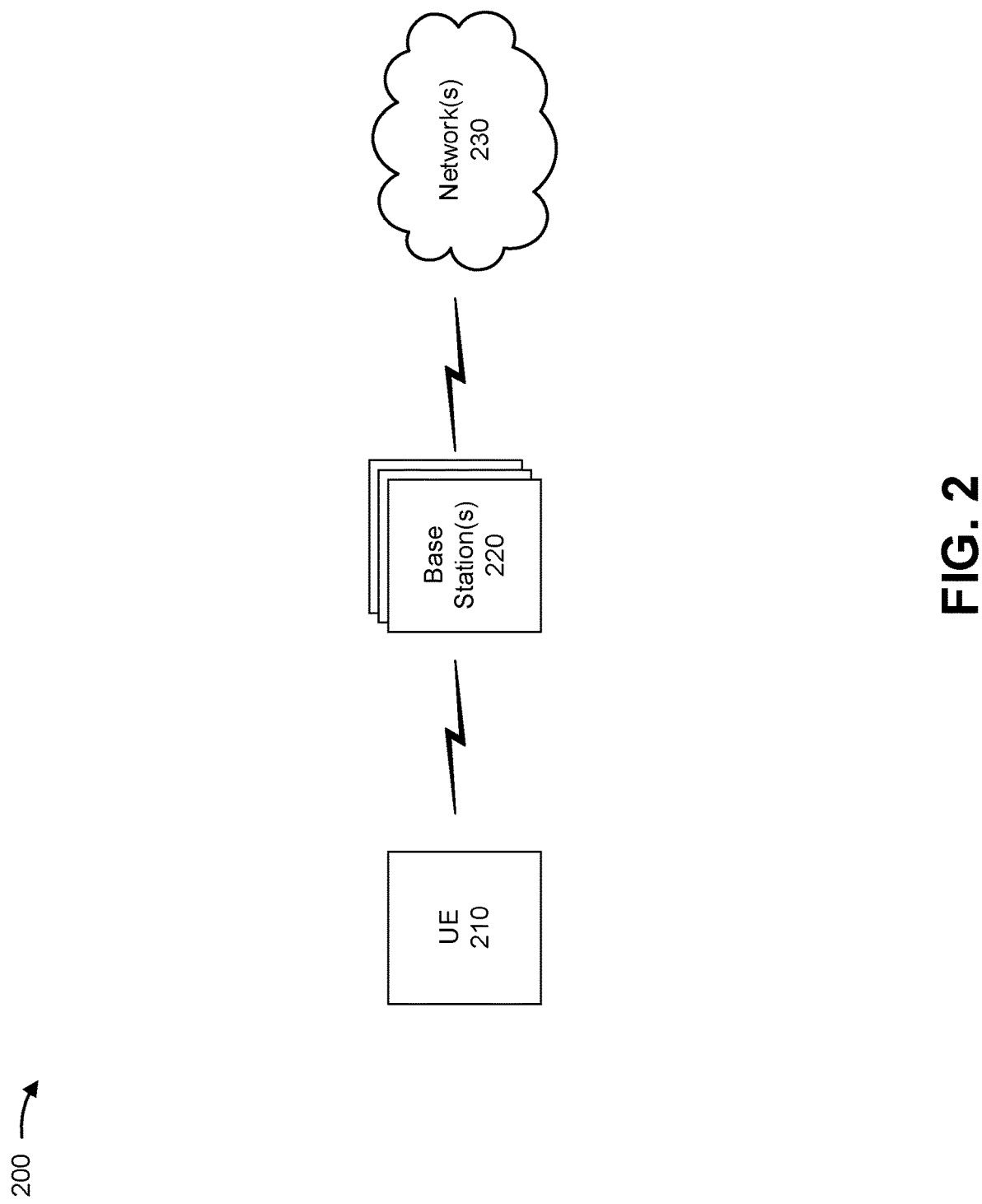
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a UE 210, one or more base stations 220, and one or more networks 230. Devices of environment 200 can interconnect via wired connections, wireless connections, or a combination of wired and wireless connections.

UE 210 can include one or more devices capable of communicating with base station 220 and/or a network (e.g., network 230). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like. In some implementations, UE 210 can be capable of communicating using multiple RATs, as described in more detail in connection with FIG. 5, below.

Base station 220 includes one or more devices capable of communicating with UE 210 using a cellular RAT. For example, base station 220 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 220 can transfer traffic between UE 210 (e.g., using a cellular RAT), other base stations 220 (e.g., using a wireless interface or a backhaul interface, such as a wired backhaul interface), and/or network 230. Base station 220 can provide one or more cells that cover geographic areas. Some base stations 220 can be mobile base stations. Some base stations 220 can be capable of communicating using multiple RATs.

In some implementations, base station 220 can perform scheduling and/or resource management for UEs 210 covered by base station 220 (e.g., UEs 210 covered by a cell provided by base station 220). In some implementations, base stations 220 can be controlled or coordinated by a network controller, which can perform load balancing, network-level configuration, and/or the like. The network controller can communicate with base stations 220 via a wireless or wireline backhaul. In some implementations, base station 220 can include a network controller, a self-organizing network (SON) module or component, or a similar module or component. In other words, a base station 220 can perform network control, scheduling, and/or network management functions (e.g., for other base stations 220 and/or for uplink, downlink, and/or sidelink communications of UEs 210 covered by the base station 220). In some implementations, base station 220 can include a central unit and multiple distributed units. The central unit can coordinate access control and communication with regard to the multiple distributed units. The multiple distributed units can provide UEs 210 and/or other base stations 220 with access to network 230.

Network 230 includes one or more wired and/or wireless networks. For example, network 230 can include a cellular network (e.g., a code division multiple access (CDMA) network, a 3G network, a 4G/LTE network, a 5G/NR network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
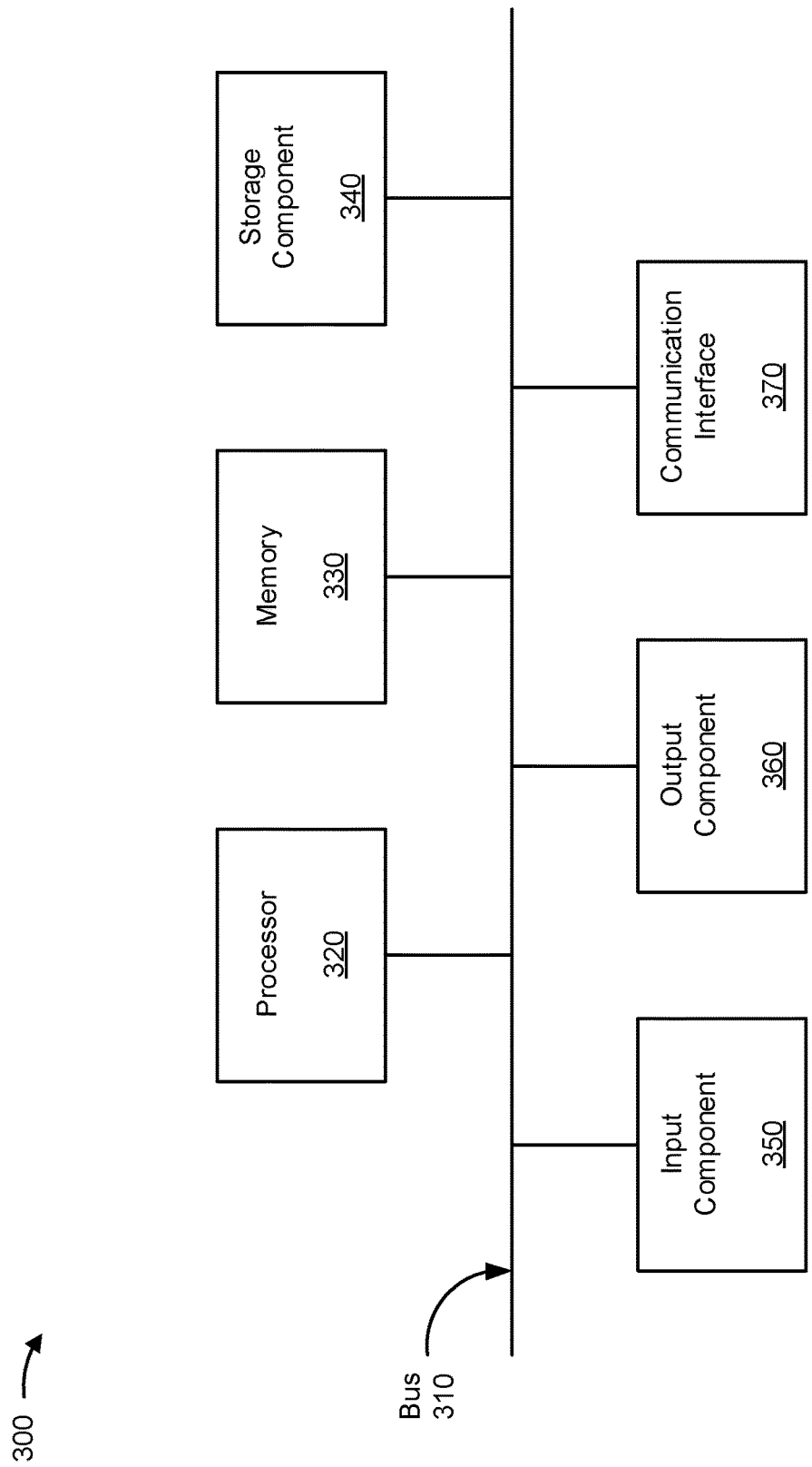
FIG. 3 is a diagram of example components of one or more devices of FIG. 2.

FIG. 3 is a diagram of example components of a device 300. Device 300 can correspond to UE 210 and/or base station 220. In some implementations UE 210 and/or base station 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes one or more memories such as a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4A:
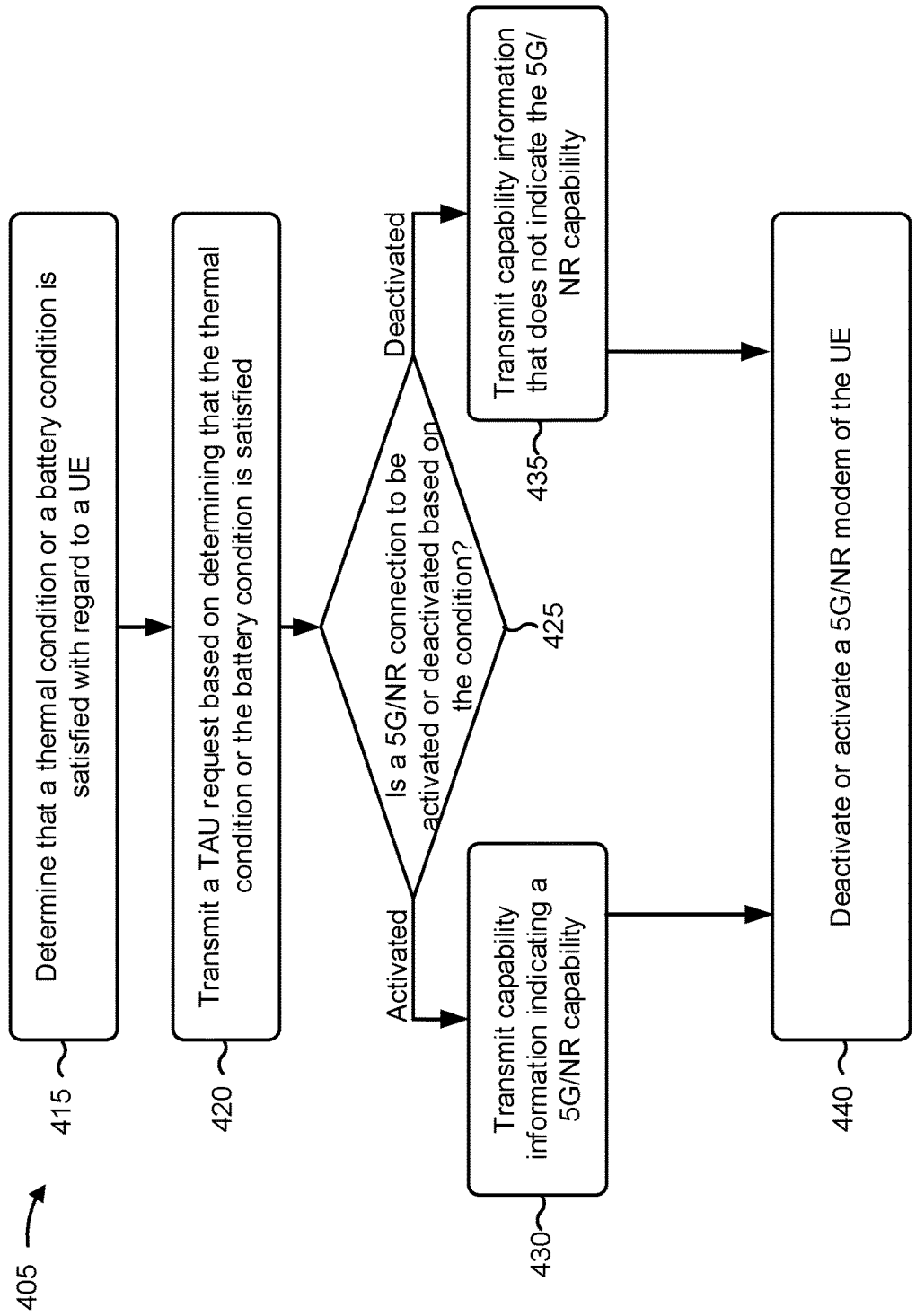

FIGS. 4A and 4B are flow charts of example processes 405 and 410 for selectively activating a 5G/NR connection based on a thermal condition or a battery condition, and for selectively reducing transmit power for a 5G/NR connection based on a maximum transmit power, respectively. In some implementations, one or more process blocks of FIG. 4 can be performed by UE 210. In some implementations, one or more process blocks of FIG. 4 can be performed by another device or a group of devices separate from or including UE 210, such as base station 220.

As shown in FIG. 4A, process 405 can include determining that a thermal condition or a battery condition is satisfied with regard to a UE (block 415). For example, UE 210 (e.g., using processor 320 or processor 510) can determine that a thermal condition or a battery condition is satisfied. In some implementations, UE 210 can determine that the thermal condition is satisfied based on a thermal value or a temperature value associated with UE 210. For example, UE 210 can determine that a first thermal condition is satisfied based on a first threshold (e.g., when the thermal value or temperature value satisfies the first threshold), or can determine that a second thermal condition is satisfied based on a second threshold (e.g., when the thermal value or temperature value satisfies the second threshold). Similarly, UE 210 can determine that a first battery condition is satisfied based on a first threshold (e.g., when a battery value satisfies the first threshold), or can determine that a second battery condition is satisfied based on a second threshold (e.g., when the battery value satisfies the second threshold). When the first threshold is satisfied, UE 210 can determine that a 5G/NR connection is to be deactivated. When the second threshold is satisfied, or when the first threshold is not satisfied, UE 210 can determine that the 5G/NR connection is to be activated.

As further shown in FIG. 4A, process 405 can include transmitting a TAU request based on determining that the thermal condition or the battery condition is satisfied (block 420). For example, UE 210 (e.g., using output component 360 or antenna 550) can transmit a TAU request. In some implementations, UE 210 can transmit the TAU request using a 4G/LTE connection of UE 210. In some implementations, UE 210 can transmit the TAU request to initiate a RRC UE capability transfer procedure so that UE 210 can provide capability information indicating whether the 5G/NR connection should be activated or deactivated, as described in more detail below.

As further shown in FIG. 4A, process 405 can include determining whether a 5G/NR connection is to be activated or deactivated based on the condition (block 425). For example, UE 210 can determine (e.g., using processor 320 or processor 510) whether a 5G/NR connection (e.g., a data connection, such as a data bearer) is to be activated or deactivated. UE 210 can determine whether the 5G/NR connection is to be activated or deactivated based on the thermal condition or the battery condition. For example, UE 210 can determine that the 5G/NR connection is to be activated when the battery condition indicates that the UE 210 has enough battery power for 5G/NR communication, or can determine that the 5G/NR connection is to be deactivated when the battery condition indicates that the UE 210 does not have enough battery power for 5G/NR communication. As another example, UE 210 can determine that the 5G/NR connection is to be deactivated when the thermal condition indicates that UE 210 is too hot for 5G/NR communication, or can determine that the 5G/NR connection is to be activated when the thermal condition indicates that UE 210 is not too hot for 5G/NR communication.

As further shown in FIG. 4A, when the 5G/NR connection is to be activated (block 415—Activated) then process 405 can include transmitting capability information indicating a 5G/NR capability (block 430). For example, when the 5G/NR connection is to be activated (e.g., when UE 210 has enough battery power for 5G/NR communication and/or when UE 210 is not too hot for 5G/NR communication), UE 210 can transmit (e.g., using output component 360 or antenna 550) capability information indicating a 5G/NR capability. In some implementations, the capability information can be provided as part of a RRC UE capability transfer procedure associated with the TAU request. In this way, UE 210 can cause BS 220 to activate a 5G/NR connection using existing signaling and communication protocols, thereby simplifying implementation and improving compatibility of process 405 with regard to existing base stations 220. In some implementations, UE 210 can provide the capability information to base station 220 on a 4G/LTE connection.

As further shown in FIG. 4A, when the 5G/NR connection is to be deactivated (block 415—Deactivated), then process 405 can include transmitting capability information that does not indicate the 5G/NR capability (block 435). For example, when the 5G/NR connection is to be deactivated (e.g., when UE 210 does not have enough battery power for 5G/NR communication and/or when UE 210 is too hot for 5G/NR communication), UE 210 (e.g., using output component 360 or antenna 550) can transmit capability information that does not indicate a 5G/NR capability. For example, the capability information can indicate only a 4G/LTE capability. In some implementations, the capability information can be provided as part of a RRC UE capability transfer procedure associated with the TAU request. In this way, UE 210 can cause BS 220 to deactivate a 5G/NR connection using existing signaling and communication protocols, thereby simplifying implementation and improving compatibility of process 405 with regard to existing base stations 220. In some implementations, UE 210 can provide the capability information to base station 220 on a 4G/LTE connection.

As further shown in FIG. 4A, process 405 can include deactivating or activating a 5G/NR modem of the UE (block 440). For example, UE 210 can include a 5G/NR modem, such as 5G/NR modem 520 described in more detail in connection with FIG. 5, below. When UE 210 is to activate the 5G/NR connection, UE 210 can activate the 5G/NR modem. When UE 210 is to deactivate the 5G/NR connection, UE 210 can deactivate the 5G/NR modem. In some implementations, UE 210 can include a single modem for 5G/NR communication and 4G/LTE communication. In such a case, UE 210 can activate or deactivate a 5G/NR component of the modem. In this way, UE 210 can conserve battery power and reduce heat generation when 5G/NR is not to be used.

FIG. 4B shows an example of a process 410 for selectively reducing transmit power for a 5G/NR connection based on a maximum transmit power, as indicated above. As shown in FIG. 4B, process 410 can include determining that a maximum transmit power condition of a UE is satisfied (block 445). For example, UE 210 (e.g., using processor 320 or processor 510) can determine that a maximum transmit power condition is satisfied. The maximum transmit power condition can be based on a power level at which UE 210 is permitted or configured to transmit. For example, UE 210 can be associated with a maximum transmit power based on a network configuration (e.g., based on closed loop power control, interference reduction, and/or the like). As another example, UE 210 can be associated with a maximum transmit power that is configured to limit battery usage of UE 210. In some implementations, the maximum transmit power condition can be based on a total radiated power (TRP) or EIRP measurement of the UE 210 or a similar value. In some implementations, the maximum transmit power described herein may be a maximum total transmit power of the UE. In some implementations, the maximum transmit power may be based on UE design constraints or regulatory requirements.

In some implementations, UE 210 can determine whether the maximum transmit power condition is satisfied based on whether a cumulative transmit power of the 4G/LTE connection and the 5G/NR connection satisfy a threshold associated with the maximum transmit power condition. In some implementations, the maximum transmit power condition can be based on a maximum transmit power of UE 210, an average transmit power of UE 210, and/or the like.

In some implementations, UE 210 can determine that the maximum transmit power condition is satisfied based on one or more active applications or services of UE 210. For example, UE 210 can determine that a particular service is active on a 4G/LTE connection, such as a service associated with a quality of service (QoS) guarantee. As another example, UE 210 can determine that a voice call (e.g., a VoLTE call) is active on the 4G/LTE connection. Based on the one or more active applications or services, UE 210 can determine whether the maximum transmit power condition is satisfied. For example, UE 210 can determine whether the maximum transmit power condition is satisfied to ensure that a transmit power for the one or more active applications or services is not compromised by a transmit power of a 5G/NR connection, thereby degrading performance of the one or more active applications or services. By determining whether the maximum transmit power condition is satisfied based on the one or more active applications or services, UE 210 conserves processor resources that would otherwise be used to determine whether the maximum transmit power condition is satisfied irrespective of active applications or services.

As further shown in FIG. 4B, process 410 can include decreasing a transmit power of a 5G/NR connection of the UE, and maintaining a transmit power of a 4G/LTE connection of the UE (blocks 450 and 455, respectively). For example, UE 210 (e.g., using processor 320 or processor 510) can maintain transmit power of the 4G/LTE connection (e.g., the connection associated with the one or more applications or services) while decreasing a transmit power of the 5G/NR connection of UE 210. In some implementations, UE 210 can decrease the transmit power of the 5G/NR connection by a particular amount. For example, when a total transmission power of UE 210 has exceeded the maximum transmit power of the UE 210 by a particular amount, UE 210 can decrease the transmit power of the 5G/NR connection by the particular amount. In some implementations, UE 210 can decrease the transmit power of the 5G/NR connection to zero. For example, UE 210 can allow the 5G/NR connection to enter radio link failure rather than decreasing the transmit power of the 4G/LTE connection. In this way, UE 210 ensures that QoS requirements and/or user experience are preserved with regard to the 4G/LTE connection, and conserves transmit power that would otherwise be used for the 5G/NR connection.

Although FIGS. 4A and 4B show example blocks of processes 405 and 410, in some implementations, processes 405 and/or 410 can include additional blocks, fewer blocks, different blocks, or differently arranged blocks than those depicted in FIG. 4. Additionally, or alternatively, two or more of the blocks of processes 405 and/or 410 can be performed in parallel.

Figure 5:
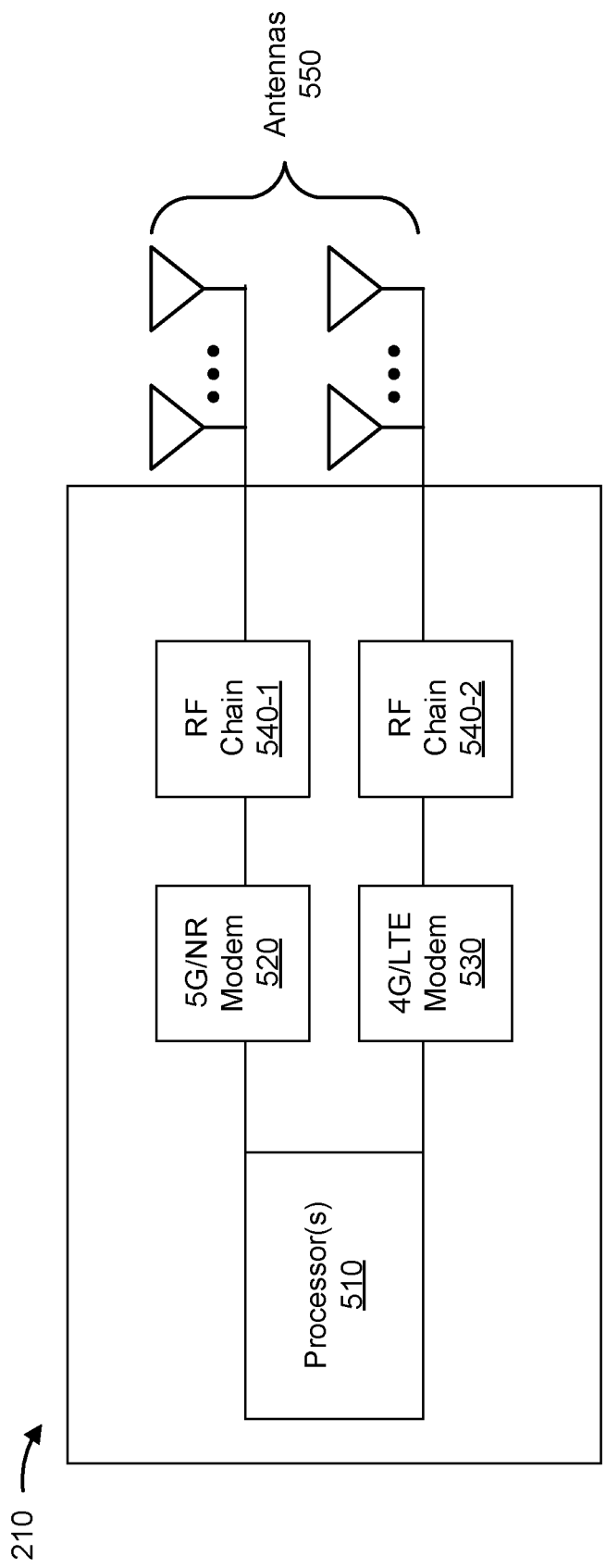
FIG. 5 is a diagram of components of a UE that is capable of communicating using E-UTRAN-New Radio dual connectivity (EN-DC)

FIG. 5 is a diagram of components of a UE 210 that is capable of communicating using EN-DC. As shown, UE 210 can include one or more processors 510. Processor 510 can include processor 320. In some implementations, processor 510 can include, for example, a transmit processor, a controller/processor, a receive processor, a transmit multiple-input multiple-output (TX MIMO) processor, a receive MIMO (RX MIMO) processor, and/or the like. Processor 510 can perform baseband processing of communications received via a 4G/LTE connection and via a 5G/NR connection. In some aspects, the 4G/LTE connection can be associated with a first processor 510 and the 5G/NR connection can be associated with a second processor 510.

As shown, UE 210 can include a 5G/NR modem 520. 5G/NR modem 520 can perform processing, modulation, demodulation, and/or the like for 5G/NR communications of UE 210. As further shown, UE 210 can include a 4G/LTE modem 530. 4G/LTE modem 530 can perform processing, modulation, demodulation, and/or the like for 4G/LTE communications of UE 210. In some implementations, 5G/NR modem 520 and 4G/LTE modem 530 can be separate components. In some implementations, 5G/NR modem 520 and 4G/LTE modem 530 can be included in the same component.

As shown, UE 210 can include radio frequency (RF) chains 540-1 and 540-2. For example, RF chain 540-1 can be for 5G/NR communications of UE 210, and RF chain 540-2 can be for 4G/LTE communications of UE 210. In some implementations, RF chain 540 can perform encoding, decoding, serialization, parallelization, mapping, transformation, guardband insertion or removal, signal upconversion/downconversion, signal amplification, signal filtering and/or the like. In some implementations, UE 210 can activate or deactivate RF chain 540 when activating or deactivating 5G/NR modem 520. For example, UE 210 can deactivate RF chain 540-1 when UE 210 deactivates 5G/NR modem 520. This can conserve battery and processor resources that would otherwise be used to operate RF chain 540-1 while 5G/NR modem 520 is inactive. In some implementations, an RF chain 540 may be used for both 4G/LTE and 5G/NR As further shown, UE 210 can include antennas 550. For example, the 5G/NR connection associated with 5G/NR modem 520 can be associated with one or more antennas 550 and the 4G/LTE connection associated with 4G/LTE modem 530 can be associated with one or more antennas 550. In some implementations, UE 210 can be associated with a plurality of antennas 550, such as one or more arrays or sub-arrays of antennas. In some implementations, antenna 550 can be considered to be a part of RF chain 540. In some implementations, antenna 550 may be shared between 4G/LTE and 5G/NR.

As indicated above, FIG. 5 is provided as an example. Other examples are possible and can differ from what was described with regard to FIG. 5.

Figure 6:
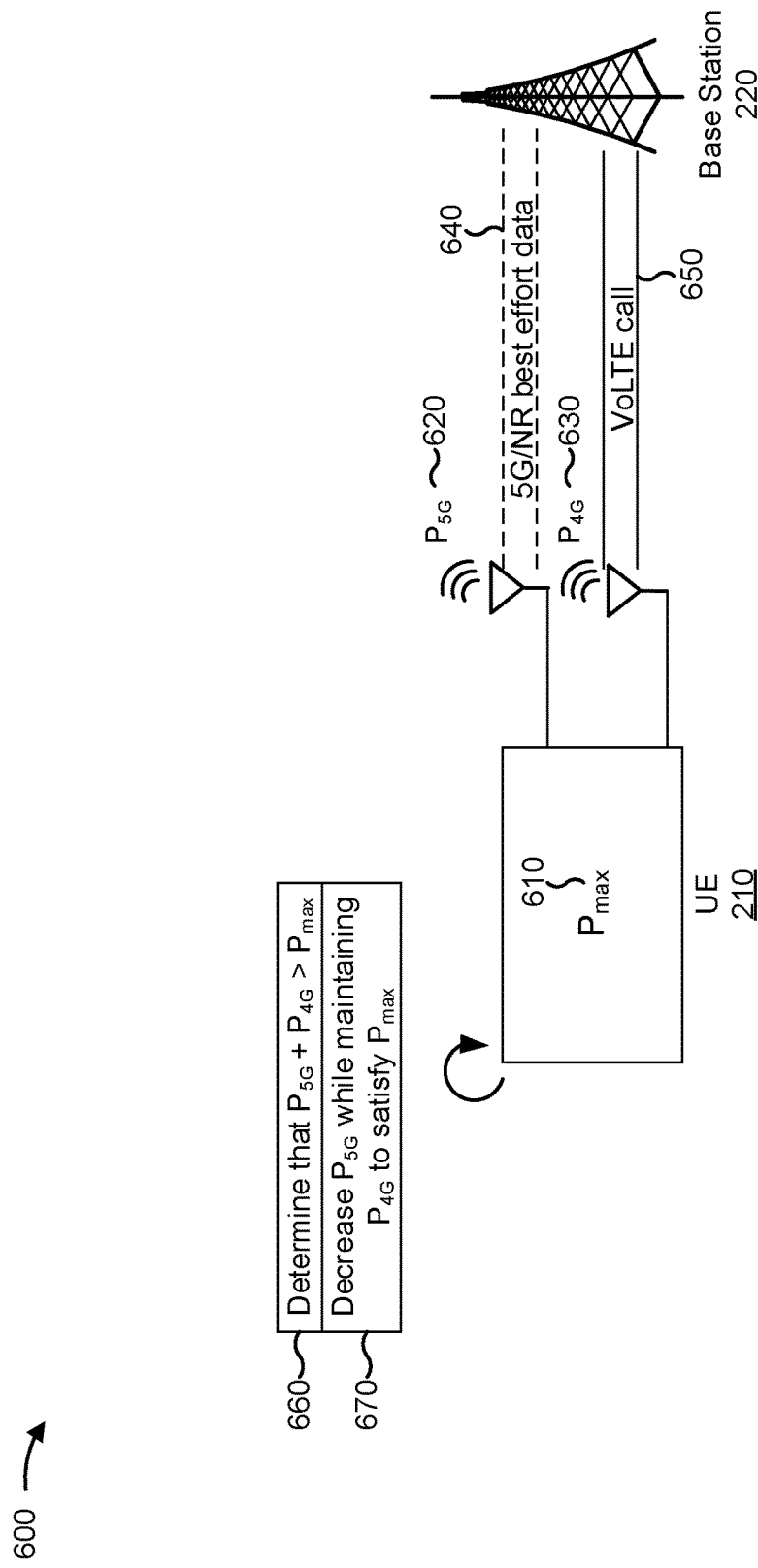
FIG. 6 is a diagram of an example implementation for selectively reducing transmit power for 5G/NR based on a maximum transmit power of a UE.

FIG. 6 is a diagram of an example implementation 600 for selectively reducing transmit power for 5G/NR based on a maximum transmit power of a UE. As shown in FIG. 6, and by reference number 610, a UE 210 can be associated with a maximum transmit power (e.g., a maximum total transmit power, shown as $P_{max}$), as described in more detail elsewhere herein. As shown by reference number 620, UE 210 can be associated with a 5G/NR transmit power (e.g., $P_{5G}$). As shown by reference number 630, UE 210 can be associated with a 4G/LTE transmit power (e.g., $P_{4G}$). The 5G/NR transmit power can be associated with a 5G/NR connection, shown by reference number 640 as a 5G/NR best effort data bearer. For example, UE 210 can use the 5G/NR connection for best-effort data, which can provide higher throughput than a 4G/LTE data bearer, and which can require transmit power in addition to the 4G/LTE transmit power.

As shown by reference number 650, the 4G/LTE transmit power can be associated with a 4G/LTE connection, shown here as a VoLTE call. For example, the VoLTE call can be associated with a particular QoS requirement, or can be associated with a priority level. The particular QoS requirement or priority level can indicate that the VoLTE call is not to be dropped and/or can indicate a particular signal quality, signal strength, or the like that is to be maintained for the VoLTE call. Therefore, it can be beneficial for UE 210 to maintain the 4G/LTE transmit power so that the VoLTE call is not impacted or dropped in the event of an uplink transmit power-limited scenario.

As shown by reference number 660, UE 210 can determine that a sum of the 4G/LTE transmit power and the 5G/NR transmit power satisfies a threshold associated with a maximum transmit power condition. Here, the threshold is equal to the maximum transmit power. In some implementations, the threshold can be based on another value, such as a particular percentage of the maximum transmit power, an average transmit power, and/or the like. As shown by reference number 670, UE 210 can decrease the 5G/NR transmit power while maintaining the 4G/LTE transmit power. For example, UE 210 can decrease the 5G/NR transmit power until the threshold described above is no longer satisfied. In some implementations, UE 210 can decrease the 5G/NR transmit power to a particular value. For example, UE 210 can decrease the 5G/NR transmit power until the 5G/NR transmit power reaches a minimum value, and might not further decrease the 5G/NR transmit power. In some implementations, UE 210 can decrease the 5G/NR transmit power to zero. In this way, UE 210 can ensure that a maximum transmit power of UE 210 is not exceeded while maintaining a QoS or priority level associated with 4G/LTE communications, thereby improving 4G/LTE throughput and conserving battery and/or radio resources of UE 210. This may also maintain 4G/LTE uplink coverage, particularly at the cell edge.

As indicated above, FIG. 6 is provided merely as an example. Other examples are possible and can differ from what was described with regard to FIG. 6.

In this way, UE 210 can conserve battery resources, reduce thermal output, and improve performance of UE 210 in uplink power-limited scenarios.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors coupled to the one or more memories, the one or more memories and the one or more processors configured to:
      determine that a thermal condition is satisfied with regard to the UE,
         wherein the UE is associated with a 4G/Long Term Evolution (4G/LTE) connection and a 5G/New Radio (5G/NR) connection;
      determine whether the 5G/NR connection is to be activated or deactivated based on the thermal condition;
      transmit a tracking area update request based on determining that the thermal condition is satisfied;
      transmit capability information,
         wherein, when the 5G/NR connection is to be activated, the capability information indicates a 5G/NR capability of the UE, and
         wherein, when the 5G/NR connection is to be deactivated, the capability information does not indicate the 5G/NR capability of the UE; and
      deactivate or activate a 5G/NR modem of the UE based on determining that the thermal condition is satisfied.

2. The UE of claim 1, wherein the 5G/NR connection is to be deactivated when a thermal value of the UE satisfies a threshold associated with the thermal condition.

3. The UE of claim 1, wherein the one or more processors are further to:
   determine that a battery condition is satisfied with regard to the UE; and
   wherein the one or more processors, when determining whether the 5G/NR connection is to be activated or deactivated, are configured to:
      determine that the 5G/NR connection is to be deactivated when a battery value of the UE satisfies a threshold associated with the battery condition.

4. The UE of claim 1, wherein the 5G/NR connection and the 4G/LTE connection are associated with a Evolved Universal Mobile Telecommunications System (UMTS) Terrestrial Radio Access network (E-UTRAN)-New Radio dual connectivity configuration of the UE.

5. The UE of claim 1, wherein the one or more processors are further to:
   determine that a maximum transmit power condition is satisfied; and
   decrease a transmit power of the 5G/NR connection based on the maximum transmit power condition being satisfied.

6. The UE of claim 5, wherein a transmit power of the 4G/LTE connection is not decreased based on the maximum transmit power condition being satisfied.

7. The UE of claim 1, wherein the tracking area update request and the capability information are transmitted using the 4G/LTE connection.

8. A non-transitory computer-readable medium storing one or more instructions for wireless communication, the one or more instructions comprising:
   one or more instructions that, when executed by one or more processors of a user equipment (UE), cause the one or more processors to:
      determine that a thermal condition is satisfied with regard to the UE,
         wherein the UE is associated with a 4G/Long Term Evolution (4G/LTE) connection and a 5G/New Radio (5G/NR) connection;
      determine whether the 5G/NR connection is to be activated or deactivated based on the thermal condition;
      transmit a tracking area update request based on determining that the thermal condition is satisfied;
      transmit capability information,
         wherein, when the 5G/NR connection is to be activated, the capability information indicates a 5G/NR capability of the UE, and
         wherein, when the 5G/NR connection is to be deactivated, the capability information does not indicate the 5G/NR capability of the UE; and
      deactivate or activate a 5G/NR modem of the UE based on determining that the thermal condition is satisfied.

9. The non-transitory computer-readable medium of claim 8, wherein the 5G/NR connection is to be deactivated when a thermal value of the UE satisfies a threshold associated with the thermal condition.

10. The non-transitory computer-readable medium of claim 8, wherein the 5G/NR connection and the 4G/LTE connection are associated with a Evolved Universal Mobile Telecommunications System (UMTS) Terrestrial Radio Access network (E-UTRAN)-New Radio dual connectivity configuration of the UE.

11. The non-transitory computer-readable medium of claim 8, wherein the one or more instructions, when executed by the one or more processors, cause the one or more processors to:
   determine that a maximum transmit power condition is satisfied; and
   decrease a transmit power of the 5G/NR connection based on the maximum transmit power condition being satisfied.

12. The non-transitory computer-readable medium of claim 11, wherein a transmit power of the 4G/LTE connection is not decreased based on the maximum transmit power condition being satisfied.

13. The non-transitory computer-readable medium of claim 8, wherein the tracking area update request and the capability information are transmitted using the 4G/LTE connection.

14. A method performed by a user equipment (UE), comprising:
   determining that a thermal condition is satisfied with regard to the UE,
      wherein the UE is associated with a 4G/Long Term Evolution (4G/LTE) connection and a 5G/New Radio (5G/NR) connection;
   determining whether the 5G/NR connection is to be activated or deactivated based on the thermal condition;

transmitting a tracking area update request based on determining that the thermal condition is satisfied;
transmitting capability information,
wherein, when the 5G/NR connection is to be activated, the capability information indicates a 5G/NR capability of the UE, and
wherein, when the 5G/NR connection is to be deactivated, the capability information does not indicate the 5G/NR capability of the UE; and
deactivating or activating a 5G/NR modem of the UE based on determining that the thermal condition is satisfied.

15. The method of claim 14, wherein the 5G/NR connection is to be deactivated when a thermal value of the UE satisfies a threshold associated with the thermal condition.

16. The method of claim 14, further comprising:
determining that a battery condition is satisfied with regard to the UE; and
wherein determining whether the 5G/NR connection is to be activated or deactivated comprises:
determining that the 5G/NR connection is to be deactivated when a battery value of the UE satisfies a threshold associated with the battery condition.

17. The method of claim 14, wherein the 5G/NR connection and the 4G/LTE connection are associated with a Evolved Universal Mobile Telecommunications System (UMTS) Terrestrial Radio Access network (E-UTRAN)-New Radio dual connectivity configuration of the UE.

18. The method of claim 14, further comprising:
determining that a maximum transmit power condition is satisfied; and
decreasing a transmit power of the 5G/NR connection based on the maximum transmit power condition being satisfied.

19. The method of claim 18, wherein a transmit power of the 4G/LTE connection is not decreased based on the maximum transmit power condition being satisfied.

20. The method of claim 14, wherein the tracking area update request and the capability information are transmitted using the 4G/LTE connection.

* * * * *